H. O. SCRANTON.
CONVEYER.
APPLICATION FILED JULY 9, 1919.
1,358,024.
Patented Nov. 9, 1920.
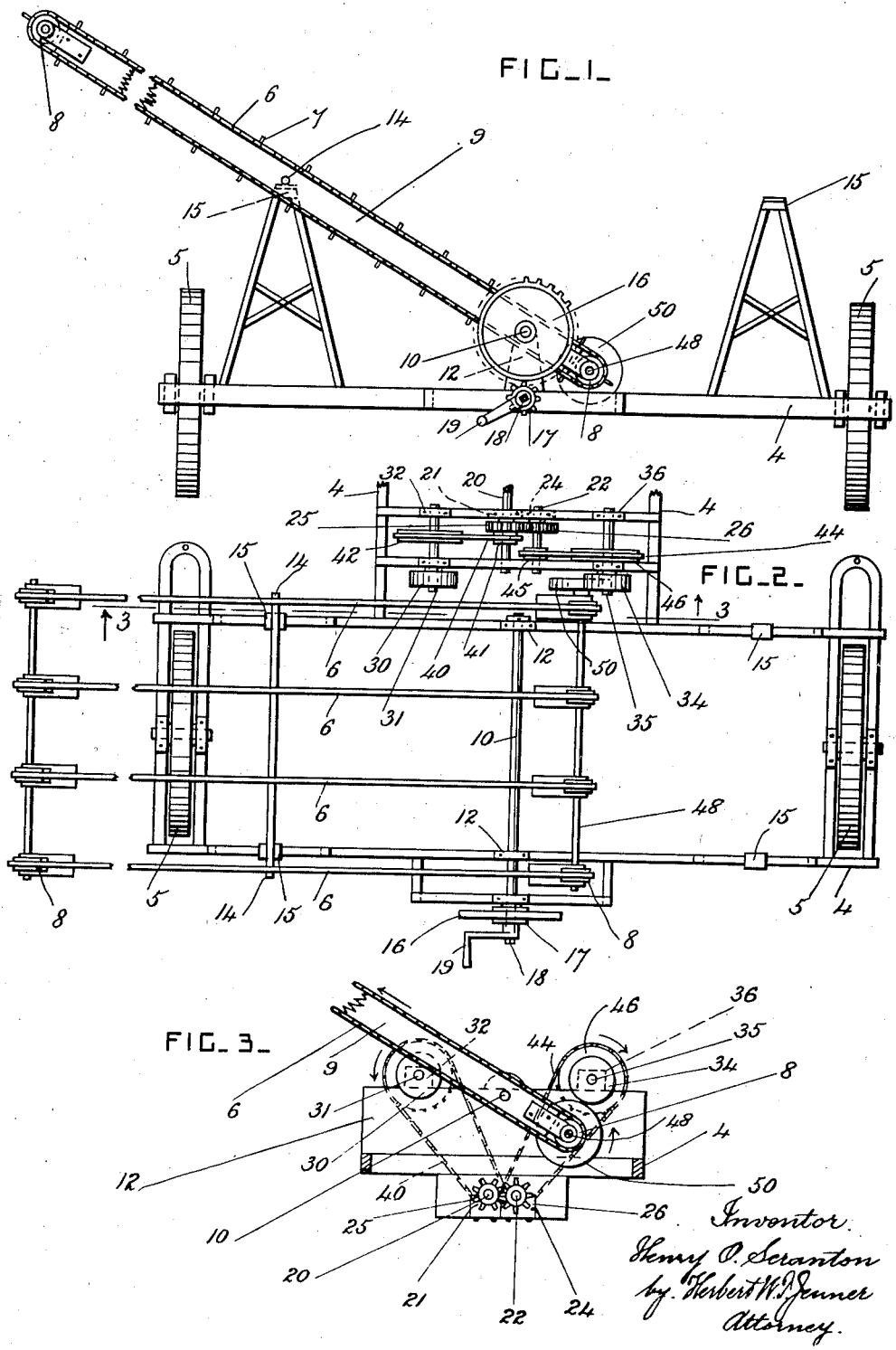

UNITED STATES PATENT OFFICE.

HENRY O. SCRANTON, OF JEANERETTE, LOUISIANA.

CONVEYER.

1,358,024.  Specification of Letters Patent.  Patented Nov. 9, 1920.

Application filed July 9, 1919. Serial No. 309,597.

*To all whom it may concern:*

Be it known that I, HENRY O. SCRANTON, a citizen of the United States, residing at Jeanerette, in the parish of Iberia and State of Louisiana, have invented certain new and useful Improvements in Conveyers, of which the following is a specification.

This invention relates to conveyers provided with endless traveling members, and specially adapted for use in connection with machinery for harvesting, topping and stripping sugar cane; and it consists in the novel construction and combination of the parts hereinafter fully described and claimed whereby the conveyer is adapted to discharge the canes or other material to the right or to the left while it is being drawn along, and is automatically connected with the driving mechanism in each extreme position.

In the drawings, Figure 1 is a rear end view of a conveyer constructed according to this invention. Fig. 2 is a plan view of the same. Fig. 3 is a rear end view of the driving mechanism, taken in section on the line 3—3 in Fig. 2.

A main support or truck 4 is provided, and is preferably mounted on ground wheels 5 so that it may be drawn along. The traveling member which discharges the sugar canes or other material, preferably comprises a series of endless chains 6 having projections 7. These chains pass over wheels or rollers 8 journaled at the end portion of a supporting frame 9. The traveling member may however be of any other approved construction. The frame 9 is pivoted by a shaft 10 to standards 12 on the truck 4. The shaft 10 is preferably journaled in the standards 12, and has the conveyer frame secured on it. The shaft 10 is arranged at the lower end portion of the frame 9, above the lower roller 8, and stops 14 are provided at its middle part. These stops are adapted to rest on pillars or trestles 15 secured to the side portions of the truck, and the conveyer is supported by them in an inclined position, and may be moved pivotally so as to project at the right hand or at the left hand of the truck. The conveyer may be tilted or reversed by hand, but a toothed wheel 16 is preferably secured on its pivot shaft 10, and is arranged in gear with a toothed pinion 17. The pinion 17 is secured on a shaft 18 journaled in bearings on the truck, and a handle 19 is secured to the shaft 18 for revolving it in each direction.

A main driving shaft 20 is journaled in bearings 21 on the truck, and is arranged under the pivot shaft 10, and is driven by any suitable means or motor. A countershaft 22 is journaled in bearings 24 on the truck to one side of the driving shaft 20, and is driven from it by toothed wheels 25 and 26 secured on the shafts 20 and 22 respectively and gearing into each other.

A friction drive wheel 30 is secured on a shaft 31 journaled in bearings 32 on the truck, and is arranged to one side of the pivot shaft 10. A similar friction wheel 34 is secured on a shaft 35 and is journaled in bearings 36 on the truck, and is arranged on the other side of the pivot shaft.

One friction wheel 30 is driven from the main shaft 20 by a drive chain 40 which passes over sprocket wheels 41 and 42 secured on the shafts 20 and 31 respectively. The other friction wheel 34 is driven from the countershaft 22 by means of a drive chain 44 which passes over sprocket wheels 45 and 46 secured on the shafts 22 and 35 respectively. Any other approved driving mechanism may however be used for driving the two friction wheels 30 and 34.

The lower roller 8 of the conveyer is secured on a revoluble shaft 48, and a friction drive wheel 50 is also secured on the shaft 48, and is arranged to bear against the friction wheels 30 and 34 according to the position of the pivoted conveying mechanism.

The canes or other material are discharged onto the lower part of the upper stretch of the endless traveling member, and are raised and delivered by it to the right or to the left hand of the truck, according to the position given to the traveling member, which can be reversed as often as desirable. The pressure between the friction driving wheels is adjusted so that the traveling member may be moved continuously, and excess of pressure is prevented by the stops 14 which rest on the pillars or trestles 15 and support a portion of the load.

What I claim is:

1. In a conveyer, a main support, an endless traveling member provided with a supporting frame having its lower end portion pivoted to the said support, and two driving wheels mounted on the said support and arranged one on each side of the pivot of the traveling member, said traveling member being automatically placed in driving engagement with one or the other of the said driving wheels when moved pivotally to discharge its load at one side or the other of the said support.

2. In a conveyer, a main support, an endless traveling member provided with a supporting frame having its lower end portion pivoted to the said support, pillars projecting upwardly from the said support and adapted to sustain the traveling member so that it projects laterally on one or the other side of the said support, and two driving wheels mounted on the said support and arranged one on each side of the pivot of the traveling member, said traveling member being automatically placed in driving engagement with one or the other of the said driving wheels when moved pivotally and rested on one or the other of the said pillars.

3. In a conveyer, a main support, an endless traveling member provided with a supporting frame having its lower end portion pivoted to the said support, a driving wheel for the traveling member arranged eccentric of its pivot, and two driving wheels mounted on the said support and arranged one on each side of the pivot of the traveling member in the path of the said driving wheel when the said member is moved pivotally.

4. In a conveyer, a main support, an endless traveling member provided with a supporting frame having its lower end portion pivoted to the said support, two driving wheels mounted on the said support and arranged one on each side of the pivot of the traveling member, a main driving shaft journaled in the main support under the said pivot, a countershaft also journaled in the said support, toothed driving wheels connecting the main shaft and countershaft, driving devices connecting the main shaft and the countershaft with the two said driving wheels respectively, and means for operating the traveling member from the said driving wheels according to the position in which it discharges its load.

In testimony whereof I have affixed my signature.

HENRY O. SCRANTON.